March 19, 1935.  H. H. HOILE  1,994,648
GLARE SHIELD FOR REAR VISION MIRRORS
Filed Feb. 5, 1932
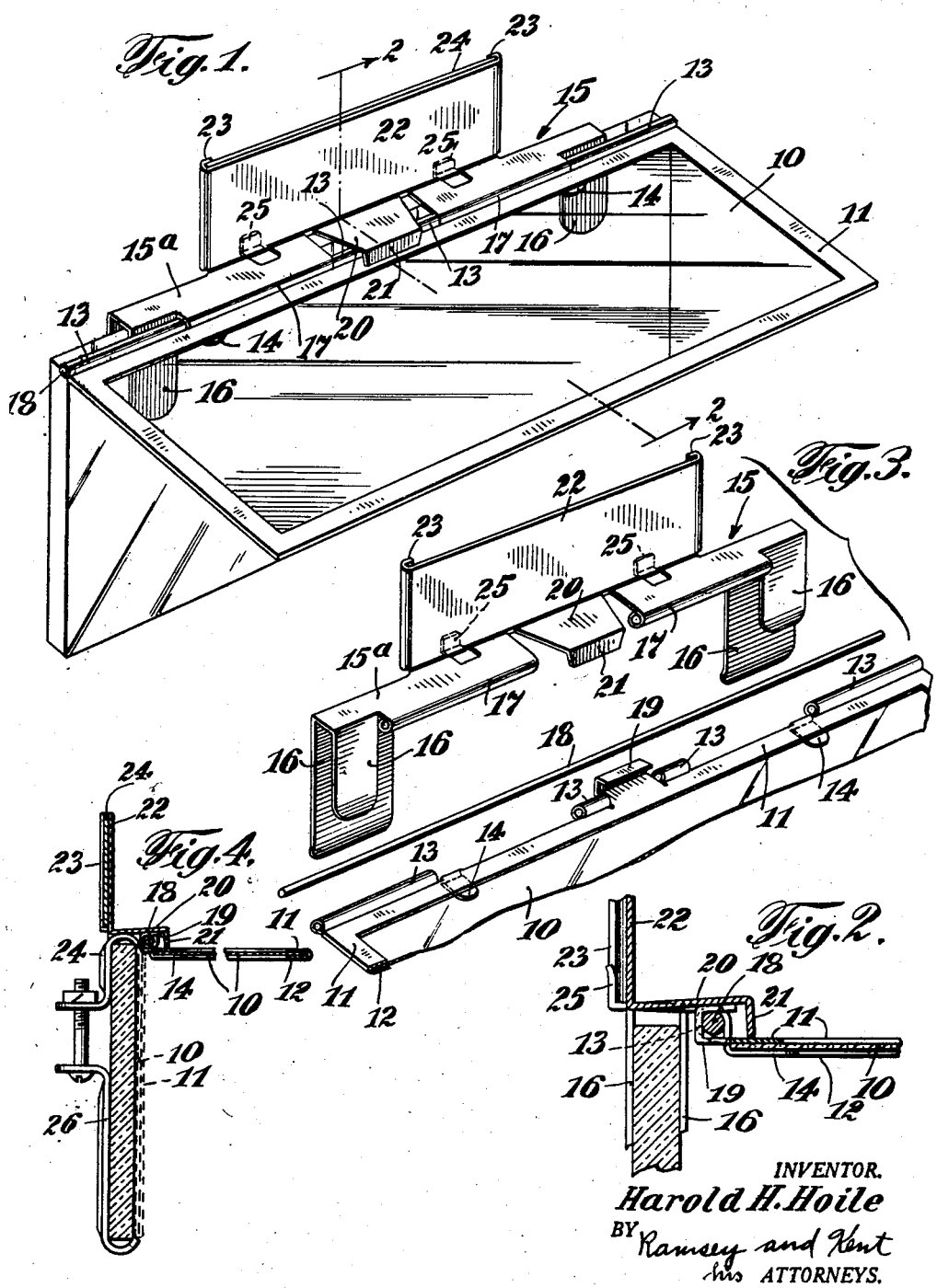
INVENTOR.
Harold H. Hoile
BY Ramsey and Kent
his ATTORNEYS.

Patented Mar. 19, 1935

1,994,648

UNITED STATES PATENT OFFICE 1,994,648

GLARE SHIELD FOR REAR VISION MIRRORS

Harold H. Hoile, East Orange, N. J.

Application February 5, 1932, Serial No. 591,056

4 Claims. (Cl. 45—97)

This invention relates to a glare shield for rear vision mirrors as commonly used on closed automobiles.

A particular object of the invention is to provide a simple and efficient mounting for such shields so that the shield can be easily applied to a mirror.

A further object of the invention is to provide a device that can be used for advertising and recording purposes in connection with the servicing of the motor vehicle in which the shield is used.

These and other objects of the invention will become apparent as the description proceeds.

While preferred forms of the invention have been disclosed for purposes of illustration, it should be understood that various changes may be made in the structure without departing from the spirit of the invention as hereinafter set forth and claimed.

In the drawing:

Figure 1 is a perspective view showing a glare shield, involving the invention, mounted upon a mirror;

Figure 2 is a section on line 2—2 of Figure 1;

Figure 3 is an exploded view showing in perspective the construction of the mounting parts;

Figure 4 is a view corresponding to Figure 2, but showing a modified construction.

While driving at night the eyes of a driver are often blinded by the reflection in his rear vision mirror of the headlights of a following automobile. In the present invention this dangerous condition is avoided by providing a glare shield 10 which may be formed of celluloid or any suitable material, and is colored amber, or any other color preferred for the purpose. The present invention provides a simple method of mounting the glare shield upon the rear vision mirror, the mounting being so arranged that the glare shield can be moved upwardly to the position illustrated in Figure 1 for daytime driving, or it can be moved down against the mirror as shown in dotted lines in Figure 4 for night driving.

The frame 11 in which the glare shield 10 is mounted is composed of a single homogeneous piece of sheet material having three of its edges doubled over to form a socket for the glare shield 10, as shown at 12 in Figure 3. Along the hinged side of the glare shield the frame 11 is rolled over to form the hinge members 13, and lugs 14 are bent backwardly to assist in holding the glare shield in place.

The mounting bracket is also formed of a single homogeneous piece of sheet metal, as shown in the upper part of Figure 3. The mounting bracket 15 includes a horizontal portion 15a, spring clips 16 which extend downwardly over the upper edge of the mirror, and the front edge of the bracket is rolled into hinge members 17, which are spaced to fit between the hinge members 13 of the frame 11. A hinge pin 18 holds the parts in assembled position as shown in Figure 1.

Suitable holding means is provided to hold the glare shield in the elevated position of Figure 1, or in the lowered night position of Figure 4, such means including a squared extension 19 extending from the upper edge of the frame 11, which cooperates with a spring finger 20 on the mounting bracket 15. The spring finger 20 carries a depending lug 21 which acts as a stop to limit upward movement of the glare shield.

In order to adapt the device to advertising purposes the mounting bracket is bent upwardly to form a display portion 22, the front face of which is visible from the interior of the automobile and may carry any suitable legend or advertising matter. The lateral edges of the plate 22 are bent rearwardly, as indicated at 23, in order to provide a pocket for holding a card 24 upon which may be noted any desired record data. Lugs 25 punched rearwardly from the mounting bracket 15 limit the lower movement of card 24.

It will be clear that the lateral edges 23 of plate 22 may be bent forwardly if it is desired to hold card 24 in front of the plate 22.

A modified construction is illustrated in Figure 4 in which the device is attached to the mirror by a screw clamp 26 instead of by the spring clips 16. Otherwise this form of the invention is identical with the form already described.

The glare shield 10 may obviously be attached to the bracket 10 without completely enclosing it in a frame such as 11. Thus, the piece of sheet material comprising the shield 10 may be riveted, or otherwise suitably attached, to a hinge strip corresponding to the hinged side of frame 11. In both cases there is a support member on which the shield 10 is mounted, said support being in one case the frame 11 and in the other the hinge strip.

The device disclosed herein is particularly adapted for advertising use by gasoline or oil companies or filling stations. The front of the display portion 22 can be suitably inscribed with the name and advertisement of the advertiser, and the card 24 can be used to keep a record, such as the mileages at which the car has been serviced. The device is very simple in construction and can be readily attached to or removed from the rear vision mirror and serves a very useful purpose in protecting the driver during night driving.

I claim:

1. A glare shield for mirrors comprising a mounting bracket having two sections, each section comprising a portion lying horizontally with hinge members along one edge, a reinforcing part connecting the two sections, a glare shield frame having hinge portions co-operative with those of the bracket sections, and a spring arm extending forwardly from the reinforcing part and engaging a part formed on the glare shield to hold the shield against rattling in raised or lowered position.

2. A glare shield for mirrors comprising a mounting bracket having two sections, each section comprising a portion lying horizontally with hinge members along one edge, a reinforcing part connecting the two sections, a pair of spring arms depending from the front and back edges of each of the horizontal portions to engage a mirror, and a glare shield hinged to the hinge members of the bracket sections.

3. A glare shield for mirrors comprising a mounting bracket having two sections, each section comprising a flat, horizontal portion with hinge members along one edge, a reinforcing plate connecting the two sections, and extending substantially at right angles to the flat, horizontal portions, and a glare shield hinged to the hinge members of the bracket sections.

4. In combination, a vertically disposed mirror, a glare shield removably attached to the mirror and comprising a mounting bracket having two sections, each section comprising a horizontal portion extending over the upper edge of the mirror, each horizontal portion having a hinge member along one edge, a reinforcing part connecting the two sections, and a glare shield frame having hinge portions cooperative with those of the bracket sections.

HAROLD H. HOILE.